(12) United States Patent
Anderson et al.

(10) Patent No.: US 8,515,637 B2
(45) Date of Patent: Aug. 20, 2013

(54) MACHINE CONTROL SYSTEM AND METHOD

(75) Inventors: Randall T. Anderson, Peoria, IL (US); Corwin E. Storer, Bartonville, IL (US)

(73) Assignee: Caterpillar Inc., Peoria, IL (US)

( * ) Notice: Subject to any disclaimer, the term of this patent is extended or adjusted under 35 U.S.C. 154(b) by 321 days.

(21) Appl. No.: 12/978,176

(22) Filed: Dec. 23, 2010

(65) Prior Publication Data
US 2012/0166050 A1 Jun. 28, 2012

(51) Int. Cl.
*G06F 17/00* (2006.01)
(52) U.S. Cl.
USPC ........... 701/59; 703/2; 318/433; 318/434
(58) Field of Classification Search
USPC ........... 701/51, 58, 59; 703/2; 318/432, 433, 434
See application file for complete search history.

(56) References Cited

U.S. PATENT DOCUMENTS

| | | | | |
|---|---|---|---|---|
| 4,107,776 A | * | 8/1978 | Beale | 701/99 |
| 4,122,732 A | * | 10/1978 | Chana | 477/69 |
| 4,135,121 A | * | 1/1979 | Stuhr | 388/807 |
| 4,444,286 A | | 4/1984 | Hawkins et al. | |
| 4,445,329 A | * | 5/1984 | Drisko | 60/431 |
| 4,593,555 A | * | 6/1986 | Krutz et al. | 73/114.25 |
| 4,802,336 A | | 2/1989 | Mayr et al. | |
| 4,813,298 A | * | 3/1989 | Kurtossy | 475/330 |
| 4,815,335 A | * | 3/1989 | Kurtossy | 475/218 |
| 4,903,792 A | * | 2/1990 | Ze-ying | 180/308 |
| 4,936,095 A | * | 6/1990 | Ross et al. | 60/444 |
| 4,981,050 A | * | 1/1991 | Kurtossy | 475/198 |
| 5,073,157 A | * | 12/1991 | Herscovici | 475/211 |
| 5,211,015 A | | 5/1993 | Schroeder | |
| 5,468,126 A | | 11/1995 | Lukich | |
| 6,010,309 A | | 1/2000 | Takamura et al. | |
| 6,170,587 B1 | | 1/2001 | Bullock | |
| 6,190,280 B1 | * | 2/2001 | Horsch | 475/209 |
| 6,427,441 B2 | | 8/2002 | Wüstefeld et al. | |
| 7,192,374 B2 | | 3/2007 | Kuras et al. | |
| 7,512,471 B2 | | 3/2009 | Nakamura et al. | |
| 7,513,110 B2 | | 4/2009 | Tatsuno et al. | |
| 2009/0112415 A1 | | 4/2009 | Hendryx | |
| 2009/0118993 A1 | | 5/2009 | Cicala et al. | |
| 2009/0223215 A1 | | 9/2009 | Kelly et al. | |
| 2009/0319136 A1 | | 12/2009 | Anderson et al. | |
| 2010/0089051 A1 | | 4/2010 | Ohtsukasa | |
| 2010/0127654 A1 | | 5/2010 | Anderson | |

FOREIGN PATENT DOCUMENTS

WO WO 2010/070961 A1 6/2010

* cited by examiner

*Primary Examiner* — Russell Frejd
(74) *Attorney, Agent, or Firm* — Finnegan, Henderson, Farabow, Garrett & Dunner LLP (57) ABSTRACT

A machine control system may include an input receiving portion configured to receive torque inputs related to a hydrostatic transmission. The input receiving portion may also receive an operator request for actuating the hydrostatic transmission. The machine control system may also include a processor configured to determine a factor based at least in part on the torque inputs, for adjusting the operator request. The processor may also be configured to determine a command for actuating the hydrostatic transmission based on the adjusted operator request, such that a torque load to be exerted on a power source by the hydrostatic transmission is within a desired range. The machine control system may further include an output sending portion configured to send the command to the hydrostatic transmission.

20 Claims, 7 Drawing Sheets

| TORQUE ERROR UNITS | -100 | -75 | -50 | 410 | 420 |
|---|---|---|---|---|---|
| FILTER FACTOR UNITS | 0.4 | 0.2 | 0.08 | 0.08 | 0.01 |

FIG. 4

TIME(sec.)

MACHINE CONTROL SYSTEM AND METHOD

TECHNICAL FIELD

This disclosure relates generally to a control system for a machine, and more particularly, to a control system for controlling one or more hydrostatic transmissions in a machine.

BACKGROUND

Machines including, for example, wheeled loaders, tracked loaders, track type tractors, and other types of heavy machinery, may be used for a variety of tasks. These machines may include a power source, such as an engine, that provides the torque to torque consuming devices in the machine, so that the machine can perform those tasks. A machine may include a control system to apportion the torque from the power source among the torque consuming devices. The control system may obtain a variety of machine inputs, and based on those inputs, may determine how much torque to apportion to each torque consuming device.

One torque consuming device a machine may include is a hydrostatic transmission, which may include a fluid motor and a pump, that may consume torque from the power source while performing various operations. The control system of the machine may apportion torque to the hydrostatic transmission based on a speed ratio, that is, a ratio of motor speed to pump speed. For example, the control system may determine pump and motor displacements to try and achieve a desired speed ratio. However, during operation, the machine may encounter a load where limitations associated with the machine's power source may prevent the desired speed ratio from being achieved. To handle such situations, the control system may include an underspeed control to reduce the desired speed ratio. In one form of underspeed control, the speed, acceleration, and/or deceleration of the power source is sensed, and is used to reduce the desired speed ratio. Such sensed data, however, may be a lagging indicator that may delay reaction of the underspeed control until machine performance has already been negatively affected.

The disclosed machine control system and method is directed at overcoming one or more of the problems set forth above, as well as other problems known in the art.

SUMMARY

According to one aspect of the present disclosure, a machine control system may include an input receiving portion configured to receive torque inputs related to a hydrostatic transmission. The input receiving portion may also receive an operator request for actuating the hydrostatic transmission. The machine control system may also include a processor configured to determine a factor based at least in part on the torque inputs, for adjusting the operator request. The processor may also be configured to determine a command for actuating the hydrostatic transmission based on the adjusted operator request, such that a torque load to be exerted on a power source by the hydrostatic transmission is within a desired range. The machine control system may further include an output sending portion configured to send the command to the hydrostatic transmission.

According to another aspect of the present disclosure, a method for controlling a machine including a power source and a hydrostatic transmission may include obtaining inputs. The inputs may include torque inputs related to the hydrostatic transmission. The inputs may also include an operator request for actuating the hydrostatic transmission. The method may also include determining a factor based at least in part on the torque inputs, for adjusting the operator request. The method may further include determining a command for actuating the hydrostatic transmission based on the adjusted operator request, such that a torque load to be exerted on the power source by the hydrostatic transmission is within a desired range. The method may also include sending the command to the hydrostatic transmission.

According to yet another aspect of the present disclosure, a machine may include a power source. The machine may also include a hydrostatic transmission including at least one pump and at least one motor. The hydrostatic transmission may be driven by the power source. The control system may include an input receiving portion configured to receive a limit on a torque load the hydrostatic transmission exerts on the power source. The input receiving portion may also be configured to receive a torque load the hydrostatic transmission exerts on the power source. The input receiving portion may further be configured to receive an operator request for actuating the hydrostatic transmission. The control system may further include a processor. The processor may be configured to determine a factor based at least in part on the torque inputs, for adjusting the operator request. The processor may also be configured to determine a command for actuating the hydrostatic transmission based on the adjusted operator request, such that a torque load to be exerted on the power source by the hydrostatic transmission is within a desired range. The control system may also include an output sending portion configured to send the command to the hydrostatic transmission.

DETAILED DESCRIPTION

The present disclosure is used in a machine. In the embodiment described below, a tracked loader machine 10 is disclosed. However, it can be appreciated that other types of machines can benefit from the embodiments disclosed herein, including, for example, any type of ground-borne vehicle, such as an automobile, a truck, an agricultural vehicle, and/or a construction vehicle, such as, a wheel loader, a dozer, a track type tractor, an excavator, a grader, an on-highway truck, an off-highway truck, and/or any type of machine known to persons skilled in the art.

Figure 1:
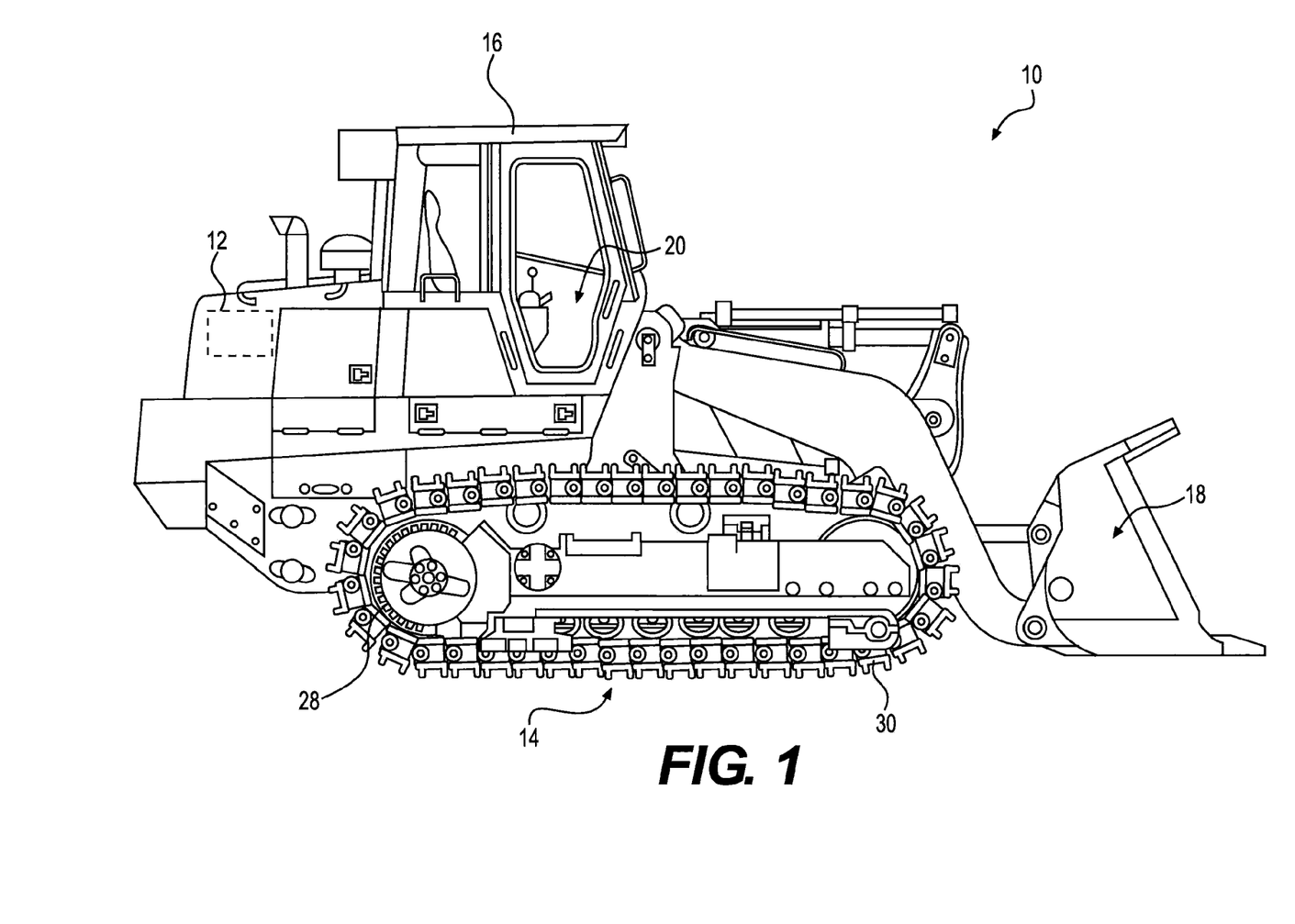
FIG. 1 is an illustration of an exemplary machine according to one aspect of the disclosure.

An exemplary tracked loader machine 10, shown in FIG. 1, includes a power source 12, a traction assembly 14, a cab 16, an implement assembly 18, as well as other machine components known to persons skilled in the art.

Power source 12 may include any assembly that generates torque, such as an internal combustion engine, including but not limited to a spark-ignition engine, a compression ignition engine, a rotary engine, a gas turbine engine, and/or an engine powered by gasoline, diesel fuel, bio-diesel, ethanol, methanol, and combinations thereof. Power source 12 may also include a hydrogen-powered engine, a fuel cell, a solar cell, and/or any other power source known to persons skilled in the art.

Cab 16 contains various controls for machine 10. For example, cab 16 may include an operator interface 20 with one or more control devices configured to permit the operator to make requests for controlling the speed and direction of travel of machine 10, and/or requests for manipulating implement assembly 18. For example, operator interface 20 may include a steering device, a joystick, hand or foot operated levers, and any other control devices known to persons skilled in the art.

Machine 10 includes one or more powered components. Power source 12 provides torque for the powered components. One of the powered components may be a hydrostatic transmission 22, shown schematically in FIG. 2. Hydrostatic transmission 22 operatively couples power source 12 to traction assembly 14 of machine 10. Hydrostatic transmission 22 includes fluid loops or hydraulic circuits, and uses fluid flow and pressure to transfer torque between power source 12 and traction assembly 14.

Figure 2:
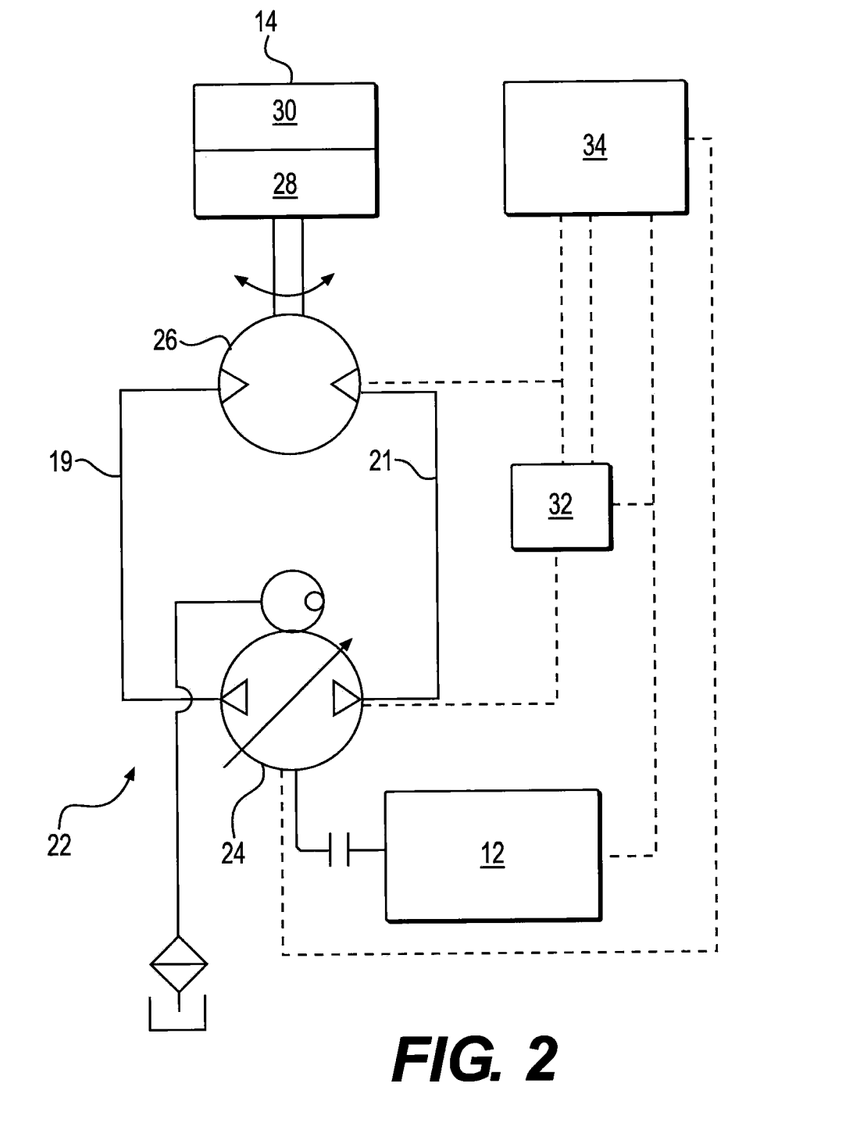
FIG. 2 is a schematic of a hydrostatic transmission according to one aspect of the disclosure.

Hydrostatic transmission 22 includes a pump 24 and a fluid motor 26 that are fluidly coupled. Pump 24 converts rotational motion of power source 12 into fluid flow. Fluid motor 26 converts the fluid flow back into rotational motion that is used to drive traction assembly 14. For example, fluid motor 26 may drive a gear assembly 28 that may be meshed with a track 30 of traction assembly 14. When gear assembly 28 rotates, track 30 is urged to move and propel machine 10 across terrain. A similar arrangement may be provided to operatively couple fluid motor 26 and another traction assembly similar to traction assembly 14, but on the other side of machine 10. Pump 24 and fluid motor 26 may be of a fixed displacement type or variable displacement type. By controlling the direction of flow and displacement of pump 24 and fluid motor 26, the direction of travel and speed of machine 10 may be controlled. For example, by setting fluid flow in pump 24 and fluid motor 26 in the forward direction, and increasing the displacement of pump 24 and/or decreasing the displacement of fluid motor 26, the speed of traction assembly 14 in the forward direction is increased. By setting fluid flow in pump 24 and fluid motor 26 in the reverse direction, and increasing the displacement of pump 24 and/or decreasing the displacement of fluid motor 26, the speed of traction assembly 14 in the reverse direction is increased. In both the forward and reverse situations described above, decreasing the displacement of pump 24 and/or increasing the displacement of fluid motor 26 decreases the speed of traction assembly 14.

Machine 10 also includes sensors 32. Sensors 32 may be located throughout machine 10, and are arranged to provide information related to machine 10. In one embodiment, sensors 32 are operable to provide signals indicative of parameters related to power source 12, any powered components, and/or any other components of machine 10. For example, sensors 32 may provide signals indicative of operating parameters related to hydrostatic transmission 22, including fluid pressure, fluid temperature, displacement, speed, and/or any other suitable operating parameters. Sensors 32 may also be operable to provide signals indicative of operating parameters related to power source 12, including, for example, engine speed.

Machine 10 also includes a control system 34 operatively coupled to power source 12, powered components including hydrostatic transmission 22, and sensors 32. Control system 34 may include one or more processors, microprocessors, central processing units, on-board computers, electronic control modules, and/or any other computing and control devices known to those skilled in the art. Control system 34 may run one or more software programs or applications stored in a memory location, read from a computer readable medium, and/or accessed from an external device operatively coupled to the control system 34 by any suitable communications network.

Control system 34 is configured to control operation of powered components like hydrostatic transmission 22. For example, control system 34 is operable to control hydrostatic transmission 22 by supplying control signals for operating pump 24 and fluid motor 26. In particular, control system 34 controls fluid flow in hydrostatic transmission 22 by, for example, controlling the displacements of pump 24 and fluid motor 26. Control system 34 controls the displacements to achieve a desired change in state based on signals received from the operator interface 20 in cab 16 and/or the sensors 32 in machine 10. Such signals may be in the form of digital, analog, mechanical, and/or hydraulic signals. Control system 34 is configured to perform steps, outlined below, to ensure that the torque load exerted on power source 12 by powered components is managed so that it does not exceed available torque from power source 12.

Figure 3:
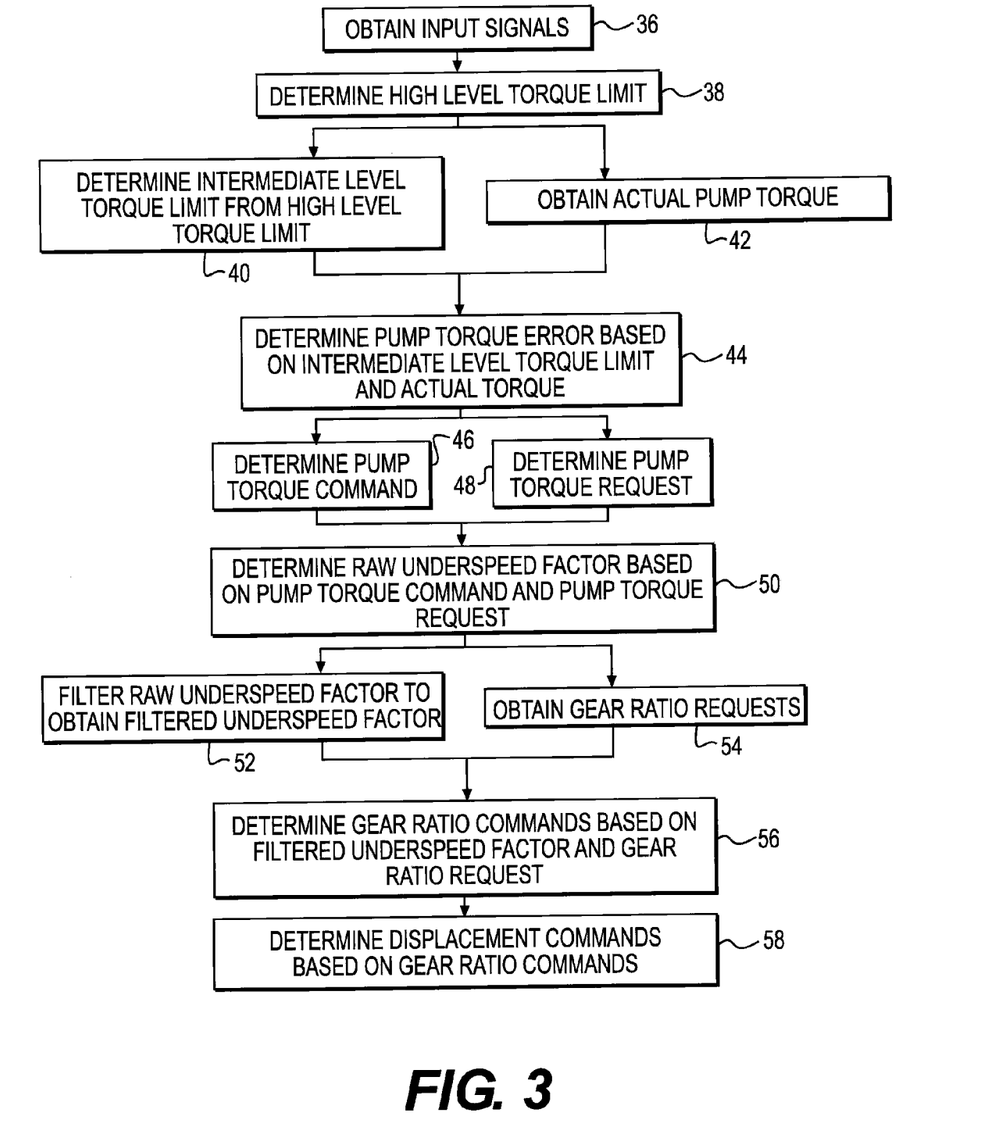
FIG. 3 is a flow diagram of a method associated with operation of a control system, according to one aspect of the disclosure.

Steps associated with operation of control system 34 and a powered component, such as hydrostatic transmission 22, are shown in the flow diagram of FIG. 3, and will now be described. Control system 34 may obtain input signals related to powered components, including, for example, pressures, flow rates, current power usage, and/or expected power usage of those components (step 36). The input signals may be in the form of signals generated by one or more electronic devices, such as sensors 32, monitoring one or more powered components. The signals may also be generated by a machine operator through a control device of operator interface 20 in cab 16, such as a joystick, steering wheel, accelerator pedal, or any other suitable control device.

Control system 34 determines or otherwise obtains a high level torque limit for power source 12 from input signals associated with power source 12 (step 38). The high level torque limit is indicative of a torque that the powered components can exert on power source 12 without forcing power source 12 to operate outside of a desired operating range. Control system 34 uses algorithms to allocate or distribute the high level torque limit between powered components. The allocation or distribution of the torque limit between powered components divides the high level torque limit into intermediate level torque limits (step 40). Each intermediate level torque limit corresponds to a particular one of the powered components, and is indicative of the torque load that the particular powered component can apply to power source 12 without forcing power source 12 to operate outside of its desired operating range.

One of the intermediate level torque limits may be a pump torque limit for pump 24 of hydrostatic transmission 22. Control system 34 is also configured to obtain an actual torque used by pump 24 of hydrostatic transmission 22 (step 42). Control system 34 subtracts the actual torque used by pump 24 from the pump torque limit, the resulting value representing a pump torque error $e_t$ (step 44). Control system 34 uses the pump torque error $e_t$ as an input for determining two factors. The first factor is a raw underspeed factor. The second factor is a filter factor. Control system 34 filters the raw underspeed factor, using the filter factor to adjust or control filtering, to determine a filtered underspeed factor. More details are provided below.

The pump torque error $e_t$ is one input used to determine the raw underspeed factor. Additional inputs are also used. The inputs may include data obtained from historical performance information, look-up tables, and/or sensors 32. Additionally or alternatively, the inputs may include values obtained by, e.g., equations for pump and motor displacements and pressures, and/or equations derived therefrom. For example, control system 34 may determine a pump torque command $T_{p,cmd}$ (step 46). The pump torque command $T_{p,cmd}$ is a command signal from pump 24, and/or a command module associated with pump 24, that commands the amount of torque pump 24 will apply to power source 12. The pump torque command $T_{p,cmd}$ may be determined using the following equation:

$$T_{p,cmd} = T_p + \frac{(k_1 e_t + k_2 \dot{e}_t)\left(\frac{|P_f - P_r|}{\Delta P_{ref}}\right) - T_p \dot{\omega}_p + D_m(P_f - P_r)\dot{\omega}_m}{\alpha_{pm}\omega_p}$$

where
$T_{p,cmd}$=pump torque command,
$T_p$=actual pump torque,
$k_1$=a proportional error gain,
$e_t$=pump torque error=$T_{p,lim}-T_p$,
$k_2$=a derivative error gain,
$\dot{e}_t$=a filtered derivative of the pump torque error,
$P_f$=a forward loop pressure,
$P_r$=a reverse loop pressure,
$\Delta P_{ref}$=a constant value representing a maximum permitted pressure differential between high and low sides of a flow loop in hydrostatic transmission x,
$\dot{\omega}_p$=a filtered derivative of pump speed,
$D_m$=motor displacement,
$\dot{\omega}_m$=a filtered derivative of motor speed,
$\alpha_{pm}$=a combined pump and motor displacement gain, and
$\omega_p$=pump speed.

The equation above for pump torque command $T_{p,cmd}$ may be derived from commanded pump and motor displacement and pressure equations by, for example, reducing or simplifying multiple pump and motor displacement and pressure equations into a single equation, and for the single equation to be case in terms of torque, rather than displacement or pressure. Reducing the equations into a single equation may help reduce computational loading on control system 34. The forward loop pressure $P_f$ is indicative of pressure in a forward loop 19 of hydrostatic transmission 22. The reverse loop pressure $P_r$ is indicative of pressure in a reverse loop 21 of hydrostatic transmission 22.

The $T_{p,cmd}$ equation incorporates a number of parameters, allowing the equation to be responsive to changes in one or more of those parameters, and making control system 34 a proportional-integral-derivative ("PID") controller with feed forward capability. For example, the portion of the $T_{p,cmd}$ equation with ($k_1 e_t + k_2 \dot{e}_t$), by incorporating the torque error $e_t$ and the derivative of torque error $\dot{e}_t$, provides an indication of not only the torque error $e_t$, but also its rate of change through the derivative of torque error $\dot{e}_t$. This gives control system 34 an indication of whether the torque error $e_t$ is trending up (increasing) or down (decreasing) without control system 34 having to wait for the torque error $e_t$ to increase or decrease to some value before control system 34 recognizes a change. Therefore control system 34 can react quickly to changing torque error $e_t$ when determining the pump torque command $T_{p,cmd}$, leading to greater stability for machine 10.

The $T_{p,cmd}$ equation also includes feed forward terms that allow control system 34 to react quickly to changing conditions. The portion of the $T_{p,cmd}$ equation with $T_p \dot{\omega}_p$ is a feed forward term, and provides control system 34 with an indication of how quickly the power of pump 24 is changing due to how quickly the speed of pump 24 is changing, allowing control system 34 to compensate for how quickly the power of pump 24 is changing. The portion of the $T_{p,cmd}$ equation with $D_m(P_f-P_r)\dot{\omega}_m$ is another feed forward term. The $D_m(P_f-P_r)\dot{\omega}_m$ portion provides control system 34 with an indication of how quickly the power of fluid motor 26 is changing, due to how quickly the speed of fluid motor 26 is changing, allowing control system 34 to compensate for how quickly the power of fluid motor 26 is changing. Including such feed forward terms when determining the pump torque command $T_{p,cmd}$ leads to greater stability for machine 10.

The portion of the $T_{p,cmd}$ equation including $\alpha_{pm}\omega_p$ acts as a normalizing term, configured to normalize the gain of control system 34 based on the speed of pump 24. The greater the value for the $\alpha_{pm}\omega_p$ portion, the smaller the gain and the slower control system 34 will act, and the smaller the value for the $\alpha_{pm}\omega_p$ portion, the greater the gain and the faster control system 34 will act. A smaller gain (slower action) is desirable when the speed of pump 24 is high, so that any changes enacted by control system 34 will not cause sudden movements or changes in machine operation that could feel jerky to the operator. A larger gain (faster action) is desirable when the speed of pump 24 is low, since the potential for causing sudden movements or changes in machine operation that feel jerky is small, and machine responsiveness may be desired. In either case, the gain helps provide greater stability for machine 10.

Control system 34 may also use inputs to determine a pump torque request $T_{p,req}$ (step 48). The pump torque request $T_{p,req}$ is a request signal from pump 24 and/or a request module associated with pump 24, and is indicative of an output power requested by pump 24. The pump torque request $T_{p,req}$ may be determined using the following equation:

$$T_{p,req} = D_{p,req}(P_f - P_r)\frac{D_m}{D_{m,req}}$$

where
$T_{p,req}$=pump torque request,
$D_{p,req}$=a pump displacement request, and
$D_{m,req}$=a motor displacement request.

The input signals used to determine the pump torque request $T_{p,req}$ may include, for example, pressure, flow rates, current power usage, expected power usage, and displacement values from sensors 32 and/or requests from operator interface 20. The pump displacement request $D_{p,req}$ is a request signal for pump 24, indicative of a displacement requested by pump 24. The motor displacement request $D_{m,req}$ is a request signal for fluid motor 26, indicative of a displacement requested for fluid motor 26.

Control system 34 may determine an underspeed factor based on the pump torque command $T_{p,cmd}$ and the pump torque request $T_{p,req}$. Control system 34 may divide the pump torque command $T_{p,cmd}$ by the pump torque request $T_{p,req}$ to determine a raw underspeed factor (step 50). Control system 34 filters the raw underspeed factor using, for example, a low pass filter, to obtain a filtered underspeed factor (step 52). The filtering frequency of the low pass filter is controlled or adjusted based on a filter factor K determined by control system 34. In one embodiment, in order to determine the filter factor K, control system 34 obtains a table, such as a look-up table 53 shown in FIG. 4, including pump torque error values and filter factor values corresponding to the pump torque error values. Control system 34 identifies the filter factor value that corresponds to the pump torque error $e_t$ in the table. This is a raw filter factor value. Control system 34 may run the raw filter factor value through a discrete rate limiter algorithm. The discrete rate limiter algorithm is useful because, during operation of machine 10, the pump torque error $e_t$ may change, and thus, the filter factor value corresponding to the pump torque error $e_t$ may change accordingly. Under certain conditions, the value for filter factor K for a particular pump torque error $e_t$ may differ from the filter factor value for the pump torque error $e_t$ from look-up table 53. For example, if the pump torque error $e_t$ is less than zero for a period of time, but is increasing for that period of time, the filter factor value will decrease for that period of time. The decrease in the filter factor value may not, however, follow what is dictated by look-up table 53. Rather, using the discrete rate limiter algorithm, control system 34 may limit the decrease in the filter factor value by, for example, slowing the rate of decrease of the filter factor value, such that the value for filter factor K during and/or at the end of the period of time will be greater than the filter factor value for the pump torque error $e_t$ from look-up table 53.

Figure 4:
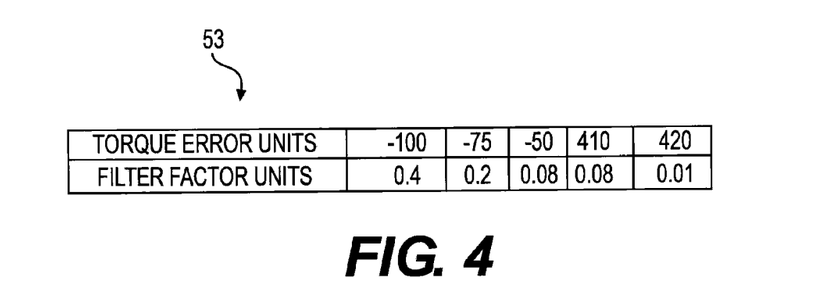
FIG. 4 is a look-up table according to one aspect of the disclosure.

Rate limiting allows the filter factor K, and thus the filter frequency, to remain at a higher value while the filter factor value from table 53 is a lower value. The higher filter factor value allows the raw underspeed factor to be filtered at a faster frequency, and thus, makes control system 34 more responsive to changes in parameters of machine 10. Once the pump torque error $e_t$ reaches zero, however, it is desirable to allow the filter factor K to decrease to a lower value, indicative of a slower filter frequency. This is because once the pump torque error $e_t$ reaches zero, making control system 34 less responsive allows machine 10 to be more stable. Trying to keep the pump torque error $e_t$ near zero is desirable because if the pump torque error $e_t$ is greater than zero by a threshold amount, it may indicate that power source 12 is being underutilized, i.e., that power source 12 has excess capacity. Conversely, if the pump torque error $e_t$ is less than zero by a threshold amount, it may indicate that pump 24 is applying too much load to power source 12, which could lead to poor performance and/or stalling of power source 12.

Under other conditions, the value for filter factor K for a particular pump torque error $e_t$ may closely follow the filter factor value for the pump torque error $e_t$ from look-up table 53. For example, if the pump torque error $e_t$ is greater than zero for a period of time, or is decreasing for that period of time, control system 34 may refrain from rate limiting the filter factor value. Thus, as the pump torque error $e_t$ changes for that period of time, the filter factor value will change accordingly based on look-up table 53, and will do so in a rapid fashion. During and/or at the end of the period of time, the value for filter factor K will be substantially equal to the filter factor value for the pump torque error $e_t$ from look-up table 53.

In another embodiment, in order to determine the filter factor K, control system obtains a ground speed of machine 10 from, for example, sensors 32. Control system 34 also obtains the torque error derivative $\dot{e}_t$. The obtained values are compared to entries in a 3-D look-up table or map (not shown) with a first axis for ground speed, a second axis for torque error derivative $\dot{e}_t$, and a third axis for the filter factor. Based on the ground speed and the torque error derivative $\dot{e}_t$ values, control system 34 selects the pertinent filter factor value from the 3-D table. Additionally, the control system 34 obtains the ground speed and torque error $e_t$ values, and compares them to entries in a 3-D look-up table or map (not shown) with a first axis for ground speed, a second axis for torque error $e_t$, and a third axis for the filter factor. Based on the ground speed and the torque error $e_t$, control system 34 selects the pertinent filter factor value from the 3-D table. The higher of the filter factor values from the two 3-D tables is selected by control system 34 as being a raw filter factor value. Control system 34 then runs the raw filter factor value through a discrete rate limiter algorithm to obtain the filter factor K, the discrete rate limiter algorithm being similar to that which has been described in the previous embodiment for determining the filter factor K.

One reason to consider the ground speed when determining the filter factor K is that at faster ground speeds, it is desirable to keep the filter factor K at a smaller value than at lower ground speeds, so that hydrostatic transmission 22 does not react as aggressively at high speeds. This helps with machine stability. One reason to consider the torque error derivative $\dot{e}_t$, and not just the torque error $e_t$, when determining the filter factor K, is because even though the torque error $e_t$ is greater than zero, it may be decreasing quickly in a negative direction. By considering the torque error derivative $\dot{e}_t$, control system 34 can recognize the decrease in the torque error (since the torque error derivative will be a negative value). If the torque error derivative $\dot{e}_t$ is negative at certain machine speeds, control system 34 will provide a greater filter factor value than it would have provided if only the torque error $e_t$ was considered in determining the filter factor value, to compensate for the decreasing torque error $e_t$ so that the torque error $e_t$ does not quickly fall into negative territory before control system 34 can react.

Once control system 34 determines filter factor K, control system 34 adjusts the frequency of low pass filter based on filter factor K. As filter factor K increases, the frequency or speed at which filtering is performed by the low pass filter increases. As filter factor K decreases, the frequency or speed at which filtering is performed by the low pass filter decreases. The low pass filter performs filtering on the raw underspeed factor, thus producing the filtered underspeed factor. Graphs 55, 57, and 59, in FIGS. 5-7, each show three curves. The top curves in graphs 55, 57, and 59 show the torque error $e_t$ over a period of time; the middle curves in graphs 55, 57, and 59 show the filter factor K over the same period of time; and the bottom curves in graphs 55, 57, and 59 show the filtered underspeed factor over the same period of time. Graphs 55, 57, and 59 differ due at least in part to graphs 55, 57, and 59 being associated with different operating conditions. For example, graph 55 depicts the torque error $e_t$, the filter factor K, and the filtered underspeed factor over a period of time when machine 10 accepts or encounters a load, such as a grade or obstacle. Graph 57 depicts the torque error $e_t$, the filter factor K, and the filtered underspeed factor over a period of time when a load is released or removed from machine 10. And graph 59 depicts the torque error $e_t$, the filter factor K, and the filtered underspeed factor over a period of time during performance of an operation with machine 10, such as a dozing cycle. Characteristics of the curves in graphs 55, 57, and 59 result from using the above-outlined methodology.

Control system 34 obtains gear ratio requests from, for example, operator interface 20 (step 54). The gear ratio requests are indicative of the type of actions the operator wants the machine to perform. Control system 34 multiplies the filtered underspeed factor by the gear ratio requests to obtain gear ratio commands (step 56). Control system 34 may determine displacement commands for pump 24 and fluid motor 26 of hydrostatic transmission 22 based on the gear ratio commands (step 58). The displacement commands are used to control pump 24 and fluid motor 26. By determining the displacement commands using the methodology outlined above, the torque load on power source 12 may be managed so that it does not exceed available torque from power source 12. As such, control system 34 prevents the power source 12 from stalling, and/or prevents the power source speed from decreasing to unacceptable levels. The above described methodology may be carried out repeatedly by control system 34 during the operation of machine 10 to perform operations with machine 10.

It is also contemplated that machine 10 may include a multipath hydrostatic transmission. An exemplary multipath hydrostatic transmission, dual path hydrostatic transmission 60, is shown schematically in FIG. 8. While a dual path embodiment will now be described, it should be understood that the multipath hydrostatic transmission may include more than two paths (and thus more than two pumps and motors), if desired.

Figure 8:
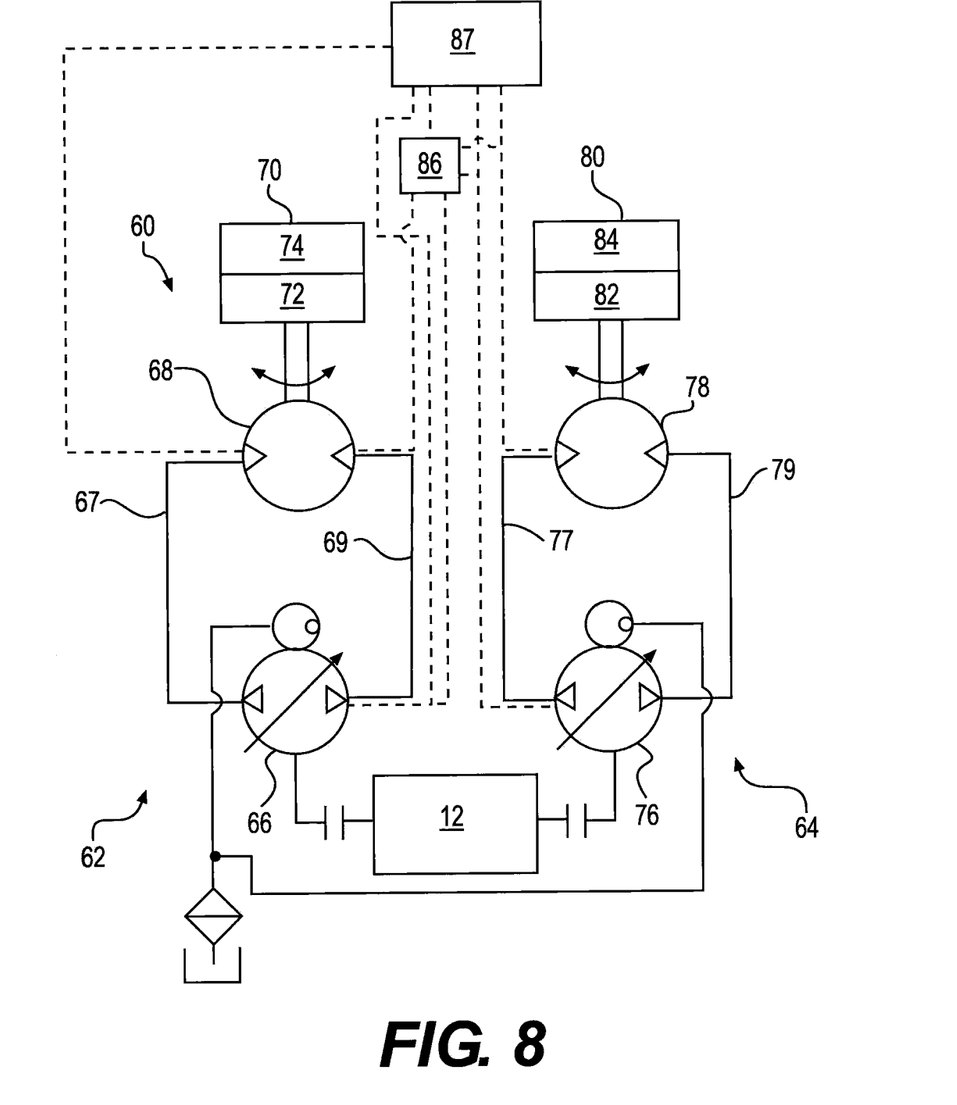
FIG. 8 is a schematic of a dual path hydrostatic transmission according to one aspect of the disclosure.

Dual path hydrostatic transmission 60 operatively couples power source 12 to left and right side traction assemblies 70 and 80 of machine 10. Dual path hydrostatic transmission 60 includes a left side hydrostatic transmission 62 and a right side hydrostatic transmission 64. Left and right side hydrostatic transmissions 62 and 64 include fluid loops or hydraulic circuits, and use fluid flow and pressure to transfer power between power source 12 and left and right side traction assemblies 70 and 80.

Left side hydrostatic transmission 62 includes a left side pump 66 and a left side fluid motor 68 that are fluidly coupled. Left side pump 66 converts rotational motion of power source 12 into fluid flow. Left side fluid motor 68 converts the fluid flow back into rotational motion that is used to drive a left side traction assembly 70. For example, left side fluid motor 68 may drive a left side gear assembly 72 that may be meshed with a left side track 74 of left side traction assembly 70. When left side gear assembly 72 rotates, left side track 74 is urged to move and propel the machine 10 across terrain. Left side pump 66 and left side fluid motor 68 may be of a fixed displacement type or variable displacement type. By controlling the direction of flow and displacement of left side pump 66 and fluid motor 68, the direction of travel and speed of machine 10 may be controlled. For example, by setting fluid flow in left side pump 66 and fluid motor 26 in the forward direction, and increasing the displacement of left side pump 66 and/or decreasing the displacement of left side fluid motor 68, the speed of left side traction assembly 70 in the forward direction is increased. By setting fluid flow in left side pump 66 and fluid motor 68 in the reverse direction, and increasing the displacement of left side pump 66 and/or decreasing the displacement of left side fluid motor 68, the speed of left side traction assembly 70 in the reverse direction is increased. In both the forward and reverse situations described above, decreasing the displacement of left side pump 66 and/or increasing the displacement of left side fluid motor 68 decreases the speed of left side traction assembly 70.

Right side hydrostatic transmission 64 includes a right side pump 76 and a right side fluid motor 78. Right side hydrostatic transmission 64 is used to control the speed and direction of a right side track 84 of a right side traction assembly 80 via a right side gear assembly 82, in a manner similar to that described above with respect to left side hydrostatic transmission 62 and left side traction assembly 70. Sensors 86 may provide signals indicative of operating parameters related to dual path hydrostatic transmission 60, including fluid pressure, fluid temperature, displacement, speed, and/or any other suitable operating parameters.

Control system 87 is configured to control operation of dual path hydrostatic transmission 60 by supplying control signals for operating left and right side pumps 66 and 76, and left and right side fluid motors 68 and 78. In particular, control system 87 controls fluid flow in dual path hydrostatic transmission 60 by, for example, controlling the displacements of left and right side pumps 66 and 76, and left and right side fluid motors 68 and 78. Control system 87 controls the displacements to achieve a desired change in state based on signals received from the operator interface 20 in cab 16 and/or the sensors 86 in machine 10. Such signals may be in the form of digital, analog, mechanical, and/or hydraulic signals.

Figure 9:
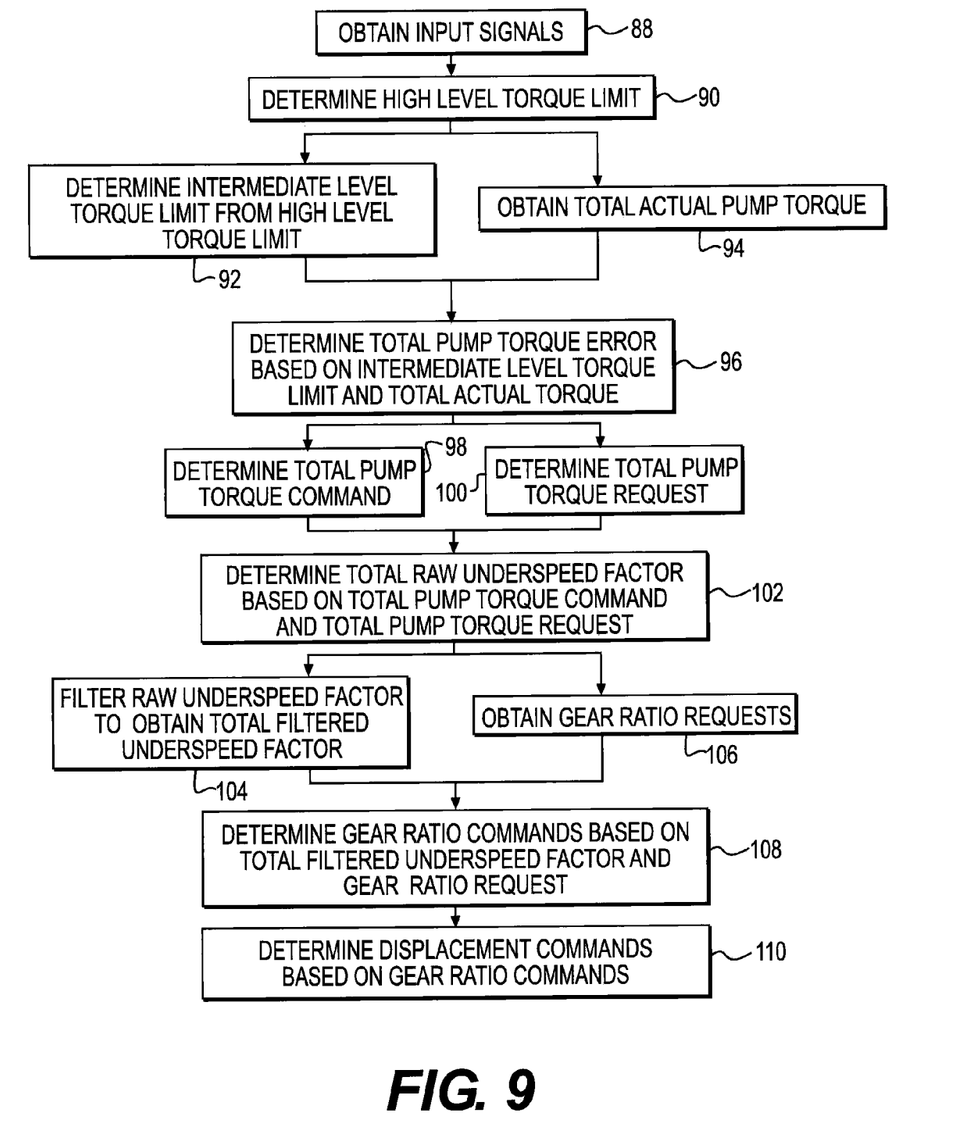
FIG. 9 is a flow diagram of a method associated with operation of a control system according to one aspect of the disclosure.

Steps associated with operation of control system 87 and dual path hydrostatic transmission 60 follow those shown in the flow diagram of FIG. 9, and will now be described. Control system 87 obtains input signals and data or values (step 88), similar to those described above in the outlined methodology associated with hydrostatic transmission 22. For example, control system 87 obtains the high level torque limit for power source 12 (step 90), and uses algorithms to allocate or distribute the high level torque limit into intermediate level torque limits (step 92). The intermediate level torque limit may be a total torque limit for dual path hydrostatic transmission 60, and in particular, for left and right side pumps 66 and 76 of dual path hydrostatic transmission 60.

Control system 87 is also configured to obtain a total actual torque used by dual path hydrostatic transmission 60 (step 94), which may be a sum of torques used by left and right side pumps 66 and 76 of dual path hydrostatic transmission 60. Control system 87 subtracts the total actual torque used from the total dual path hydrostatic transmission torque load limit, the resulting value representing a total pump torque error $e_t$ (step 96). Control system 87 uses the total pump torque error as an input for determining two factors. The first factor is a total raw underspeed factor. The second factor is a total filter factor. Control system 87 filters the total raw underspeed factor, using the filter factor to adjust or control filtering, to determine a total filtered underspeed factor. More details are provided below.

The total pump torque error $e_t$ is one input used to determine the raw underspeed factor. Additional inputs are also used. The inputs may include data obtained from historical performance information, look-up tables, and/or sensors 86. Additionally or alternatively, the inputs may include equations for pump and motor displacements and pressures, and/or equations derived therefrom, such as the equations outlined above in the discussion related to hydrostatic transmission 22. For example, control system 87 may determine a total pump torque command $T_{p,cmd,total}$ (step 98). The total pump torque command $T_{p,cmd,total}$ is a command signal from left and right side pumps 66 and 76, and/or one or more command modules associated with left and right side pumps 66 and 76, that commands the total amount of torque left and right side pumps 66 and 76 will apply to power source 12. The total pump torque command $T_{p,cmd,total}$ may be determined using the following equation:

$$T_{p,cmd,total} = T_{p,total} + \frac{(k_1 e_t + k_2 \dot{e}_t)\left(\frac{|P_{f,left} - P_{r,left}| + |P_{f,right} - P_{r,right}|}{2 \times \Delta P_{ref}}\right) - T_{p,total}\dot{\omega}_p + D_{m,left}(P_{f,left} - P_{r,left})\dot{\omega}_{m,left} + D_{m,right}(P_{f,right} - P_{r,right})\dot{\omega}_{m,right}}{\alpha_{pm}\omega_p}$$

where $T_{p,cmd,total}$=total pump torque command,
$T_{p,total}$=total actual pump torque=$D_{p,left}(P_{f,left}-P_{r,right})+D_{p,right}(P_{f,right}-P_{r,right})$,
$k_1$=a proportional error gain,
$e_t$=total pump torque error=$T_{p,lim,total}-T_{p,total}$,
$k_2$=a derivative error gain,
$\dot{e}_t$=a filtered derivative of the total pump torque error,
$P_{f,left}$=a forward loop pressure for left side pump,
$P_{r,left}$=a reverse loop pressure for left side pump,
$P_{f,right}$=a forward loop pressure for right side pump,
$P_{r,right}$=a reverse loop pressure for right side pump,
$\Delta P_{ref}$=a constant value representing a maximum permitted pressure differential between high and low sides of a flow loop in dual path hydrostatic transmission,
$\dot{\omega}_p$=a filtered derivative of pump speed,
$D_{m,left}$=motor displacement for left side motor,
$D_{m,right}$=motor displacement for right side motor,
$\dot{\omega}_{m,left}$=a filtered derivative of motor speed for left side motor,
$\dot{\omega}_{m,right}$=a filtered derivative of motor speed for right side motor,
$\alpha_{pm}$=a combined pump and motor displacement gain, and
$\omega_p$=pump speed of left side pump, right side pump, or a combination of those speeds.

The equation above for the total pump torque command $T_{p,cmd,total}$ may be derived from multiple commanded pump and motor displacement equations. The forward loop pressures $P_{f,left}$ and $P_{f,right}$ are indicative of pressures in left and right side forward loops 67 and 77 of dual path hydrostatic transmission 60. The reverse loop pressures $P_{r,left}$ and $P_{r,right}$ are indicative of pressures in left and right side reverse loops 69 and 79 of dual path hydrostatic transmission 60.

Control system 87 may also use inputs to determine a total pump torque request $T_{p,req,total}$ (step 100). The total pump torque request $T_{p,req,total}$ is a request signal from pumps 66 and 76 and/or a request module associated with pumps 66 and 76, and is indicative of output power requested by pumps 66 and 76. The total pump torque request $T_{p,req,total}$ may be determined using the following equation:

$$T_{p,req,total} = D_{p,req,left}(P_{f,left} - P_{r,left})\frac{D_{m,left}}{D_{m,req,left}} + D_{p,req,right}(P_{f,right} - P_{r,right})\frac{D_{m,right}}{D_{m,req,right}}$$

where $T_{p,req,total}$=total pump torque request,
$D_{p,req,left}$=a pump displacement request for left side pump,
$D_{m,req,left}$=a motor displacement request for left side motor,
$D_{p,req,right}$=a pump displacement request for right side pump, and
$D_{m,req,right}$=a motor displacement request for right side motor.

Input signals used to determined the total pump torque request $T_{p,req,total}$ may include, for example, pressure, flow rates, current power usage, expected power usage, and displacement values from sensors 86 and/or operator interface 20, requesting torque from power source 12. The pump displacement requests $D_{p,req,left}$ and $D_{p,req,right}$ are request signals for left and right side pumps 66 and 76, indicative of displacements requested for left and right side pumps 66 and 76. The motor displacement requests $D_{m,req,left}$ and $D_{m,req,right}$ are request signals for left and right side fluid motors 68 and 78, indicative of displacements requested for left and right side fluid motors 68 and 78.

The above equations may be modified to include additional terms for multipath hydrostatic transmissions with more than two paths. For example, the above equations may be modified in the manner shown below for multipath hydrostatic transmissions with n paths:

$$T_{p,cmd,total} \text{ (for all paths)} = T_{p,total} + \frac{(k_1 e_t + k_2 \dot{e}_t)\left(\frac{|P_{f,left} - P_{r,left}| + |P_{f,right} - P_{r,right}| + \ldots + |P_{f,n} - P_{r,n}|}{n \times \Delta P_{ref}}\right) - T_{p,total}\dot{\omega}_p + D_{m,left}(P_{f,left} - P_{r,left})\dot{\omega}_{m,left} + D_{m,right}(P_{f,right} - P_{r,right})\dot{\omega}_{m,right} + \ldots + D_{m,n}(P_{f,n} - P_{r,n})\dot{\omega}_{m,n}}{\alpha_{pm}\omega_p}$$

where $T_{p,cmd,total}$=total pump torque command (for all paths),
$T_{p,total}$=total actual pump torque (for all paths)=$D_{p,left}(P_{f,left}-P_{r,right})+D_{p,right}(P_{f,right}-P_{r,right})+\ldots+D_{p,n}(P_{f,n}-P_{r,n})$
$k_1$=a proportional error gain,
$e_t$=total pump torque error (for all paths)=$T_{p,lim,total}-T_{p,total}$,
$k_2$=a derivative error gain,
$\dot{e}_t$=a filtered derivative of the total pump torque error,
$P_{f,left}$=a forward loop pressure for left side pump,
$P_{r,left}$=a reverse loop pressure for left side pump,
$P_{f,right}$=a forward loop pressure for right side pump,
$P_{r,right}$=a reverse loop pressure for right side pump,
$P_{f,n}$=a forward loop pressure for pump n,
$P_{r,n}$=a reverse loop pressure for pump n,
$\Delta P_{ref}$=a constant value representing a maximum permitted pressure differential between high and low sides of a flow loop in a multipath hydrostatic transmission,
$\dot{\omega}_p$=a filtered derivative of pump speed,
$D_{m,left}$=motor displacement for left side motor,
$D_{m,right}$=motor displacement for right side motor,
$D_{m,n}$=motor displacement for motor n,
$\dot{\omega}_{m,left}$=a filtered derivative of motor speed for left side motor,
$\dot{\omega}_{m,right}$=a filtered derivative of motor speed for right side motor,
$\dot{\omega}_{m,n}$=a filtered derivative of motor speed for motor n,
$\alpha_{pm}$=a combined pump and motor displacement gain, and
$\omega_p$=pump speed of left side pump, right side pump, pump n, or a combination of those speeds.

$$T_{p,req,total} = D_{p,req,left}(P_{f,left} - P_{r,left})\frac{D_{m,left}}{D_{m,req,left}} + D_{p,req,right}(P_{f,right} - P_{r,right})\frac{D_{m,right}}{D_{m,req,right}} + \ldots + D_{p,req,n}(P_{f,n} - P_{r,n})\frac{D_{m,n}}{D_{m,req,n}}$$

where $T_{p,req,total}$=total pump torque request (for all paths),
$D_{p,req,left}$=a pump displacement request for left side pump, $D_{m,req,left}$=a motor displacement request for left side motor,
$D_{p,req,right}$=a pump displacement request for right side pump,
$D_{m,req,right}$=a motor displacement request for right side motor,
$D_{p,req,n}$=a pump displacement request for pump n, and
$D_{m,req,n}$=a motor displacement request for motor n.

Control system 87 may divide the total pump torque command $T_{p,cmd,total}$ by the total pump torque request $T_{p,req,total}$ to determine the total raw underspeed factor (step 102). Control system 87 filters the total raw underspeed factor (steps 104) using, for example, a low pass filter, to obtain a total filtered underspeed factor. The filtering speed of the low pass filter is controlled or adjusted based on a filter factor K determined by control system 87. In one embodiment, in order to determine the filter factor K, control system 87 obtains a table, such as a look-up table 53 shown in FIG. 4, including total pump torque error values and filter factor values corresponding to the pump torque error values. In another embodiment, in order to determine the filter factor K, control system 87 obtains 3-D look-up tables/maps (not shown), similar to those described above in the discussion of hydrostatic transmission 22. The other steps are similar to steps described above in the discussion of hydrostatic transmission 22.

Figure 5:
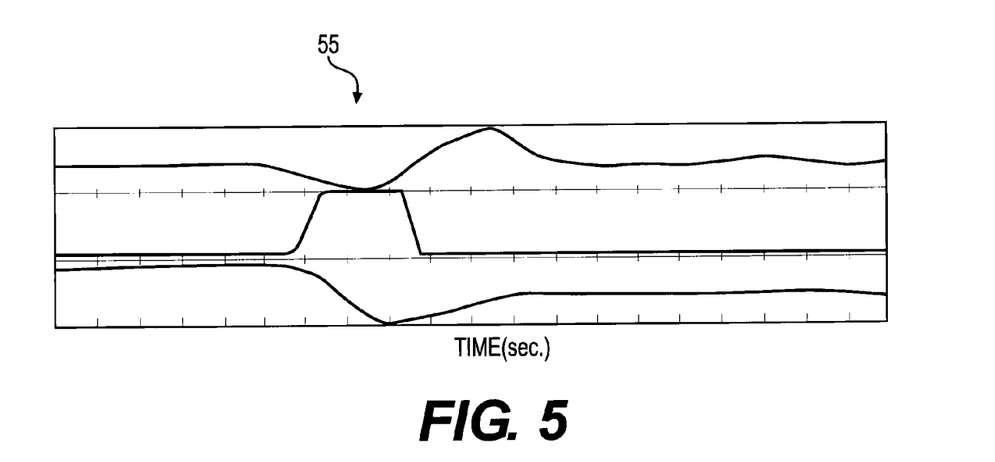
FIGS. 5-7 are graphs showing torque error values, filter factor values, and underspeed factor values, over time, according to one aspect of the disclosure.
Figure 6:
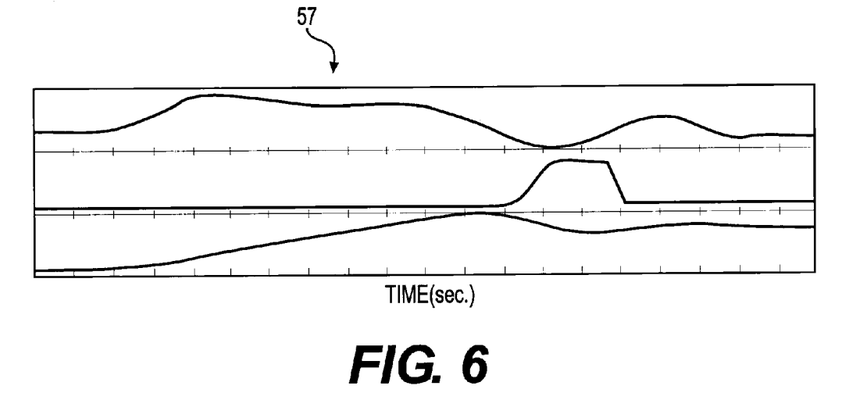
Figure 7:
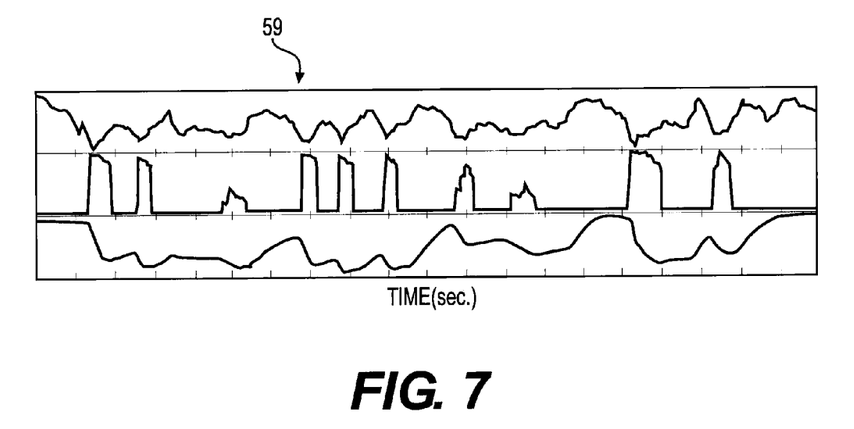

Once control system 87 determines filter factor K, control system 87 adjusts the frequency of low pass filter based on filter factor K. As filter factor K increases, the frequency or speed at which filtering is performed by the low pass filter increases. As filter factor K decreases, the frequency or speed at which filtering is performed by the low pass filter decreases. The low pass filter performs filtering on the total raw underspeed factor, thus producing the total filtered underspeed factor. The relationships between the total torque error $e_t$, the filter factor K, and the total filtered underspeed factor, over a period of time, may also be represented by graphs 55, 57, and 59, where the topmost curve is for the total torque error $e_t$, the middle curve is for the filter factor K, and the lowermost curve is for the total filtered underspeed factor.

Control system 87 obtains gear ratio requests from, for example, operator interface 20 (step 106). The gear ratio requests are indicative of the type of actions the operator wants the machine to perform. Control system 87 multiplies the total filtered underspeed factor by the gear ratio requests to obtain gear ratio commands (step 108).

Control system 87 may determine displacement commands for left and right side pumps 66 and 76, and left and right side fluid motors 68 and 78, of dual path hydrostatic transmission 60, based on the gear ratio commands (step 110). The displacement commands are used to control pumps 66 and 76 and fluid motors 68 and 78. By determining the displacement commands using the methodology outlined above, the torque load on power source 12 may be managed so that it does not exceed available torque from power source 12. The above described methodology may be carried out repeatedly by control system 87 during the operation of machine 10 to perform operations with machine 10.

INDUSTRIAL APPLICABILITY

The disclosed control systems 34 and 87 may have applicability in machines, and may have may have particular applicability in machines including a power source 12 and a hydrostatic transmission 22, or a multipath hydrostatic transmission such as dual path hydrostatic transmission 60, that exerts a torque load on the power source. When a torque load on power source 12 is excessive, the speed of power source 12 may decrease to or fall below an underspeed set point, causing power source 12 to stall or become more susceptible to stalling. Control systems 34 and 87 may be operable to prevent this type of overloading by determining torque inputs, and based at least in part on those torque inputs, determining an underspeed factor by which to scale operator requests, thereby ensuring that commands for actuating hydrostatic transmissions 22 and 60, which may be based on the operator requests, will not overload power source 12.

The algorithms used by control systems 34 and 87 incorporate a number of parameters, allowing the equation to be responsive to changes in one or more of those parameters, and making control systems 34 and 87 proportional-integral-derivative ("PID") controllers with feed forward capability. As such, control systems 34 and 87 may recognize whether a parameter value is trending up or trending down, and how quickly, and thus, control systems 34 and 87 need not wait for the parameter value to increase or decrease to some threshold before recognizing a change. Therefore control systems 34 and 87 can react quickly to changing parameter values, leading to greater stability for and more efficient operation of machine 10. The algorithms used by control systems 34 and 87 also scale outputs based on machine speed and/or pump speed, thus providing slower action at high speeds, and faster action at low speeds, to avoid causing sudden movements or changes in machine operation that could feel jerky to the operator or decrease machine stability.

What is claimed is:

1. A machine control system, comprising:
   an input receiving portion configured to receive:
      torque inputs related to a hydrostatic transmission, and
      an operator request for actuating the hydrostatic transmission;
   a processor configured to:
      determine a factor based at least in part on the torque inputs, for adjusting the operator request, and
      determine a command for actuating the hydrostatic transmission based on the adjusted operator request, such that a torque load to be exerted on a power source by the hydrostatic transmission is within a desired range; and
   an output sending portion configured to send the command to the hydrostatic transmission.

2. The machine control system of claim 1, wherein the torque inputs include a limit on a torque load the hydrostatic transmission exerts on a power source.

3. The machine control system of claim 2, wherein the torque inputs include a torque load the hydrostatic transmission exerts on the power source.

4. The machine control system of claim 3, further including one or more sensors configured to provide the torque inputs.

5. The machine control system of claim 3, wherein the processor is configured to determine the factor in part by determining a torque error indicative of a difference between the torque load limit and the torque load exerted.

6. The machine control system of claim 5, wherein the processor is configured to determine the factor in part by determining a torque command for the hydrostatic transmission based at least in part on the torque error.

7. The machine control system of claim 6, wherein the processor is configured to determine the factor in part by determining a torque request for the hydrostatic transmission based at least in part on the torque error.

8. The machine control system of claim 7, wherein the processor is configured to determine the factor in part by dividing the torque command by the torque request to obtain a raw factor.

9. The machine control system of claim 8, wherein the processor is configured to determine the factor by filtering the raw factor.

10. The machine control system of claim 9, wherein filtering is based on a filter factor selected based at least in part on the torque error.

11. The machine control system of claim 9, wherein the processor is configured to determine the factor in part by using a discrete rate limiter on the filter factor.

12. A method for controlling a machine including a power source and a hydrostatic transmission, the method comprising:
obtaining inputs including:
torque inputs related to the hydrostatic transmission, and
an operator request for actuating the hydrostatic transmission;
determining a factor based at least in part on the torque inputs, for adjusting the operator request, and
determining a command for actuating the hydrostatic transmission based on the adjusted operator request, such that a torque load to be exerted on the power source by the hydrostatic transmission is within a desired range; and
sending the command to the hydrostatic transmission.

13. The method of claim 12, wherein determining the factor includes determining a torque command for the hydrostatic transmission based at least in part on the torque inputs.

14. The method of claim 13, wherein determining the factor includes determining a torque request for the hydrostatic transmission based at least in part on the torque inputs.

15. The method of claim 14, wherein determining the factor includes dividing the torque command by the torque request to obtain a raw factor.

16. The method of claim 15, wherein determining the factor includes filtering the raw factor based on a filter factor selected based at least in part on the torque inputs.

17. A machine, comprising:
a power source;
a hydrostatic transmission including at least one pump and at least one motor, the hydrostatic transmission being driven by the power source;
a control system including:
an input receiving portion configured to receive:
a limit on a torque load the hydrostatic transmission exerts on the power source, and
a torque load the hydrostatic transmission exerts on the power source, and
an operator request for actuating the hydrostatic transmission;
a processor configured to:
determine a factor based at least in part on the torque load limit and the torque load exerted, for adjusting the operator request, and
determine a command for actuating the hydrostatic transmission based on the adjusted operator request, such that a torque load to be exerted on the power source by the hydrostatic transmission is within a desired range; and
an output sending portion configured to send the command to the hydrostatic transmission.

18. The machine of claim 17, wherein the command is such that the torque load to be exerted on the power source allows a speed of the power source to remain in a desired speed range.

19. The machine of claim 17, wherein the input receiving portion is further configured to receive a pump torque command and a pump torque request.

20. The machine of claim 19, wherein the processor is configured to determine the factor based at least in part on the pump torque command and the pump torque request.

* * * * *